United States Patent [19]

Yeoh et al.

[11] Patent Number: 5,528,394
[45] Date of Patent: Jun. 18, 1996

[54] FERROELECTRIC LIQUID CRYSTAL DEVICE HAVING FREQUENCY ≦500 HZ AND VOLTAGE ≦35 VOLTS THAT SWITCHES A C1 CHEVRON STRUCTURE TO A C2 CHEVRON STRUCTURE

[75] Inventors: Colin T. H. Yeoh, London; Philip G. White, Isleworth, both of United Kingdom

[73] Assignee: GEC Marconi Limited, United Kingdom

[21] Appl. No.: 302,938

[22] PCT Filed: Jan. 17, 1994

[86] PCT No.: PCT/GB94/00089

§ 371 Date: Oct. 21, 1994

§ 102(e) Date: Oct. 21, 1994

[87] PCT Pub. No.: WO94/17441

PCT Pub. Date: Aug. 4, 1994

[30] Foreign Application Priority Data

Jan. 20, 1993 [GB] United Kingdom .................. 9301051

[51] Int. Cl.⁶ .......................... G02F 1/1343; G02F 1/13
[52] U.S. Cl. .............................................. 359/56; 359/100
[58] Field of Search ....................... 359/100, 104, 359/56

[56] References Cited

U.S. PATENT DOCUMENTS

| | | | |
|---|---|---|---|
| 4,781,440 | 11/1988 | Toda | 359/84 |
| 4,792,211 | 12/1988 | Harada et al. | 359/76 |
| 5,013,137 | 5/1991 | Tsuboyama et al. | 359/56 |
| 5,016,988 | 5/1991 | Iimura | 359/63 |
| 5,184,237 | 2/1993 | Iimura et al. | 359/63 |
| 5,189,536 | 2/1993 | Hanyu et al. | 359/63 |
| 5,250,214 | 10/1993 | Kanemoto et al. | 359/63 |
| 5,268,783 | 12/1993 | Yoshinaga et al. | 359/103 |
| 5,294,366 | 3/1994 | Shimizu et al. | 359/103 |
| 5,372,745 | 12/1994 | Yoshinaga et al. | 359/51 |
| 5,380,459 | 1/1995 | Kanemoto et al. | 359/73 |

FOREIGN PATENT DOCUMENTS

| | | |
|---|---|---|
| 0307959 | 3/1989 | European Pat. Off. . |
| 0444705A3 | 9/1991 | European Pat. Off. . |
| 0496628A2 | 7/1992 | European Pat. Off. . |
| 0532210A2 | 3/1993 | European Pat. Off. . |
| 2240635 | 8/1991 | United Kingdom . |

OTHER PUBLICATIONS

Japanese Journal of Applied Physics, "Four States of Surface–Stablized Ferroelectric Liquid Crystal with Parallel Rubbing", Nov. 31, 1992, No. 11, Part 1, Tokyo, JP, pp. 3632–3635.

*Primary Examiner*—Anita Pellman Gross
*Assistant Examiner*—Toan Ton
*Attorney, Agent, or Firm*—Kirschstein, et al.

[57] ABSTRACT

A ferro-electric liquid crystal device comprises a substrate having a surface alignment layer, the surface alignment layer providing a pre-tilt angle $\beta \geq 10°$ with directors of a nematic liquid crystal. Smectic liquid crystal layers of the device have a C2 chevron configuration with a chevron angle $\delta$ in the range of $2° \leq \delta \leq 15°$, the C2 chevron being such that $\theta_c - \delta \geq \beta$, wherein $\beta$ is the pre-tilt angle, $\theta_c$ is one half of chiral smectic cone angle and $\delta$ is a chevron angle. A bistable switching angle $\theta s$ of the device is $\geq 12°$. A method of producing such ferro-electric liquid crystal devices comprises the steps of providing a liquid crystal device having the surface alignment layer and C1 chevron structure only and applying a low frequency ($\leq 500$ Hz) and low voltage ($\leq 35$) AC waveform to the device so as to eliminate C1 chevron structure and to replace the C1 chevron structure with the C2 chevron structure.

4 Claims, 3 Drawing Sheets

C1 CHEVRON     C2 CHEVRON

FERROELECTRIC LIQUID CRYSTAL DEVICE HAVING FREQUENCY ≦500 HZ AND VOLTAGE ≦35 VOLTS THAT SWITCHES A C1 CHEVRON STRUCTURE TO A C2 CHEVRON STRUCTURE

BACKGROUND OF THE INVENTION

The invention relates to a ferro-electric liquid crystal device.

EP-A-0032362 discloses a surface stabilized FLC device which possesses bistability and fast switching. However, in most real devices as cooled from the isotropic phase to the $S_c^*$ phase, instead of a structure consisting of smectic layers normal to the substrate interface as disclosed in EP-A-0032362, a tilted layer structure called a chevron is obtained. Consequently, this gives rise to a relatively small effective bistable switching angle which tends to reduce the overall optical performance of the device. The existence of two different forms of the chevron structure also provides an alignment texture consisting of visible defects called 'zig-zags'. These defects usually degrade the appearance of the device.

In order to overcome the above problems of zig-zag defects and a reduced switching angle, a liquid crystal device has been proposed in GB2191870-B in which the surface pre-tilt angle matches the half cone angle of the ferro-electric liquid crystal material. However this technique presently requires the use of a vacuum deposited surface alignment layer in order to generate the required pre-tilt angle of 22.5°, which is costly for use in high volume production.

GB2183054 B, discloses the application of a high voltage, low frequency electrical signal to a ferro-electric liquid crystal device to irreversibly reduce the chevron angle so that at the end of the electrical treatment, a layer structure known as the Quasi Bookshelf Geometry (QBG), very similar to the idealised bookshelf, is obtained. Such samples not only have large electrical threshold but also contain defects which scatter light and reduce optical performance.

Based on the relative orientation of the surface pre-tilt, β and the chevron inclination, two forms of tilted layer structure can be realized; Chevron 1 (C1) and Chevron 2 (C2) as disclosed in an article by J. Kanbe et el. Ferro-electrics 14,(1991)P3. The geometrical conditions for these forms are given in FIG. 1 where δ and $\theta_c$ are the chevron angle and half of the $S_c^*$ cone angle respectively. The value of $\theta_c$ is usually arranged to be ≈22.5° and from X-ray diffraction measurements, δ is typically 90% of $\theta_c$ i.e. ≈20°.

In devices with low values of the surface pre-tilt angle (β), both C1 and C2 chevrons are stable i.e. both $\theta_c+\delta>\beta$ and $\theta_c-\delta\leq\beta$ can be satisfied respectively. Under these conditions both chevrons are found; zig-zag defects occur at the boundary between the two chevron states and there is very little twist of the director profile in the plane of the substrate through the thickness of the cell. The bistable switching angle ($2\theta_s$) which is defined as the angle between the projection of the optic axis of tile two memory states onto the substrate plane is given approximately by $$\cos\theta_s \approx \cos\theta_c/\cos\delta$$

As the chevron angle, δ, is very similar in value to $\theta_c$, $\theta_s$ is typically between 6° and 10°.

As the surface pre-tilt is increased, zig-zag defects cease to occur because only the C1 chevron is stable i.e. $\theta_c+\delta>\beta$ can be satisfied but $\theta_c-\delta>\beta$ cannot be satisfied. In addition, the director profile within the bistable domains becomes twisted. When such samples are switched by electrical pulses, two types of bistable states can be obtained: bistable twisted states and bistable planar states. The former correspond to the switching of the director only at the chevron interface. The latter, which correspond to the director switching at the substrate interface, require very large electrical switching pulses (i.e. high voltages and long pulse widths).

In order to achieve large bistable switching angle in low pre-tilt samples, there is disclosed in tile reports (W. J. A. M. Hartman Ferro-electric, 122, 1991 and H. Reiger, et. al. SID 91 Digest (1991), P.137), the application of a low frequency (1–200 Hz) electric field treatment which changes the chevron layer structure. The change is manifested as an increase in the bistable switching angle associated with a decrease in the chevron angle. The resulting structure is known as the "Quasi Bookshelf Geometry" (QBG). The zig-zag defects which are present in the pre-treated (before field treatment) alignment texture vanish as the low frequency square wave signal is applied. As the amplitude of the signal increases, "field line" or "roof-top" defects appear and at a sufficiently high voltage "striped" domains perpendicular to the smectic layer form. After each texture change, the sample requires a progressively larger electrical pulse to switch. In the final "striped" domain texture, latching of the sample would require a pulse three of more times larger than that of the pre-treated texture, but the bistable switching angle increases from a pre-treatment value of say 14° to a value very close to that of the smectic cone angle of 45° after the treatment. The latter leads to improvements in the contrast and transmission of the electro-optic device, but the presence of defects tends to reduce the value of these two parameters.

SUMMARY OF THE INVENTION

According to the invention there is provided a ferro-electric liquid crystal device comprising a substrate having a surface alignment layer, the surface alignment layer providing a pre-tilt angle $\beta\geq10°$ with directors of a nematic liquid crystal and wherein smectic liquid crystal layers of the device have a C2 chevron configuration with a chevron angle δ in the range of $2°\leq\delta\leq15°$, the C2 chevron being such that $\theta_c-\delta\geq\beta$, wherein β is said pre-tilt angle, $\theta_c$ is one half of chiral smectic cone angle and δ is a chevron angle arid wherein a bistable switching angle $\theta_s$ of the device is $\geq12°$.

Preferably the surface alignment layer is a robbed polymer layer. The surface alignment layer may be formed of silicon monoxide or magnesium fluoride.

Further according to the invention there is provided a method of producing the above mentioned ferro-electric liquid crystal device which comprises the steps of providing a liquid crystal device having said surface alignment layer and C1 chevron structure only and applying a low frequency (≦500 Hz) and low voltage (≦35)AC wave form to the device so as to eliminate C1 chevron structure and to replace the C1 chevron structure with the C2 chevron structure.

The liquid crystal device embodying the invention has increased bistable switching angle, and consequently improved the optical performance, without a large increase in electrical threshold, and has a uniform alignment texture.

In a ferro-electric liquid crystal device embodying the invention the surface alignment layer may provide a pre-tilt angle of β in the range $\beta\geq10°$ when measured with a nematic liquid crystal such as E7 and the natural alignment in the $S_c$· phase has been modified by the method embodying the present invention such that a configuration is obtained in which the chevron angle, δ is in the range $2° \leq δ \leq 15°$, and the condition $θ_c - δ \geq β$ is satisfied and the bistable switching angle $θ_s \geq 12°$.

In a ferro-electric liquid crystal device with a surface alignment that provides a high pre-tilt angle only the C1 chevron is stable, the C2 chevron is naturally unstable because $θ_c - δ \geq β$ cannot be satisfied. However, as a result of an appropriate treatment by the method of the present invention, which reduces the value of the chevron angle δ, the C2 Chevron can be rendered stable. Normally under such conditions, one would expect the zig-zag defects which are not desired will return because of the presence of both C1 and C2 Chevrons. However, the use Of the high pre-tilt surface alignment layer ($β \geq 10°$) leads to a higher degree of twist of the LC director through the thickness of the cell in the C1 chevron than for the C2 chevron. Consequently, the C2 chevron will be more stable than the C1 chevron, and under these favourable conditions, the C1 chevron can be eliminated and replaced by C2 chevron.

The advantages of a C2 chevron, with a high pre-tilt and a small chevron angle are that it provides a relatively large (up to 35°) switching angle between the bistable states, which in turn provides a high contrast bright display, a defect free alignment texture is obtained and switching between the two stable states can be achieved by the use of relatively low voltage pulses.

A sample prepared with a high pre-tilt polyimide surface alignment layer gives a pre-tilt angle of about 15° for a nematic liquid crystal. The alignment as cooled from the isotropic liquid of the ferro-electric liquid crystal to $S_c$·, consists of only twisted C1 chevron states. In order to achieve the alignment structure as proposed by the present invention, a low frequency, low voltage ($\leq 25$ V) electrical signal is applied to the ferro-electric liquid crystal which should have a spontaneous polarization value in the range $\geq 7 nC/cm^2$.

The alignment structure in the present invention may be extended to other values of the pre-tilt angle when the following conditions are met:

The appropriate treatment is preferably the application of a low frequency ($\leq 500$ Hz), low voltage AC waveform ($\leq 35$ V).

The ferro-electric liquid crystal phase may be a chiral smectic C phase.

The less ordered liquid crystal phase may be a smectic A phase or may be a nematic phase.

The pre-tilt angle between the director and the surface of the substrate may be provided by the use of a rubbed polymer layer, or may be provided by the use of a layer of obliquely evaporated silicon monoxide or magnesium fluoride.

The device embodying the present invention may be used to provide a display with memory.

BRIEF DESCRIPTION OF THE DRAWINGS

The invention will now be further described by way of example with reference to the accompanying drawings in which.

DETAILED DESCRIPTION OF THE PREFERRED EMBODIMENT

Figure 2:
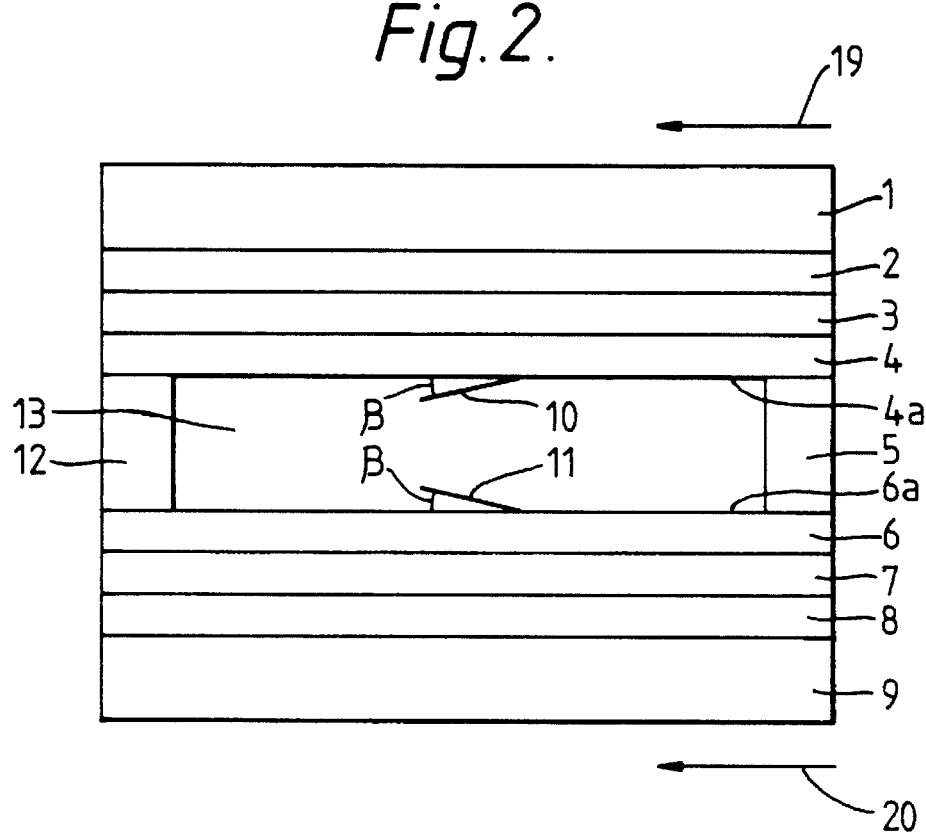
FIG. 2 illustrates a ferro-electric crystal device according to the present invention.

A liquid crystal device illustrated in FIG. 2 comprises upper and lower glass substrates 1 and 9. The inner surfaces of these substrates carry transparent electrodes or conductive coatings, 2 and 8 of indium tin oxide. Protecting films 3 and 7 of $SiO_2$ (Liquicoat by Merck Ltd) having a thickness of 100–1000A° are formed on electrodes 2 and 8 by spin coating. On the inner surface of the protecting films 3 and 7 orientation layers, 4 and 6 of LQ1800 (manufactured by Hitachi) are deposited also by spin coating. Subsequently, the orientation direction is induced on layers 4 and 6 through the rubbing of the surfaces 4a and 6a using a cloth made of 100% viscose. Spacers 5 and 12 are used to provide spacing of 2 μm between surfaces 4a and 6a of layers 4 and 6. The plate substrates 1 and 9 (comprising the layers 2, 3, 4, 6, 7 and 8) are assembled as shown in FIG. 2 such that the alignment layers 4 and 6 have the same rubbing directions 19 and 20 parallel to the layers 4 and 6. The alignment layers 4 and 6 cause the liquid crystal directions 10 and 11 to be fixed at a surface pre-tile angle β to the plane by the substrates 1 and 9.

Figure 3:
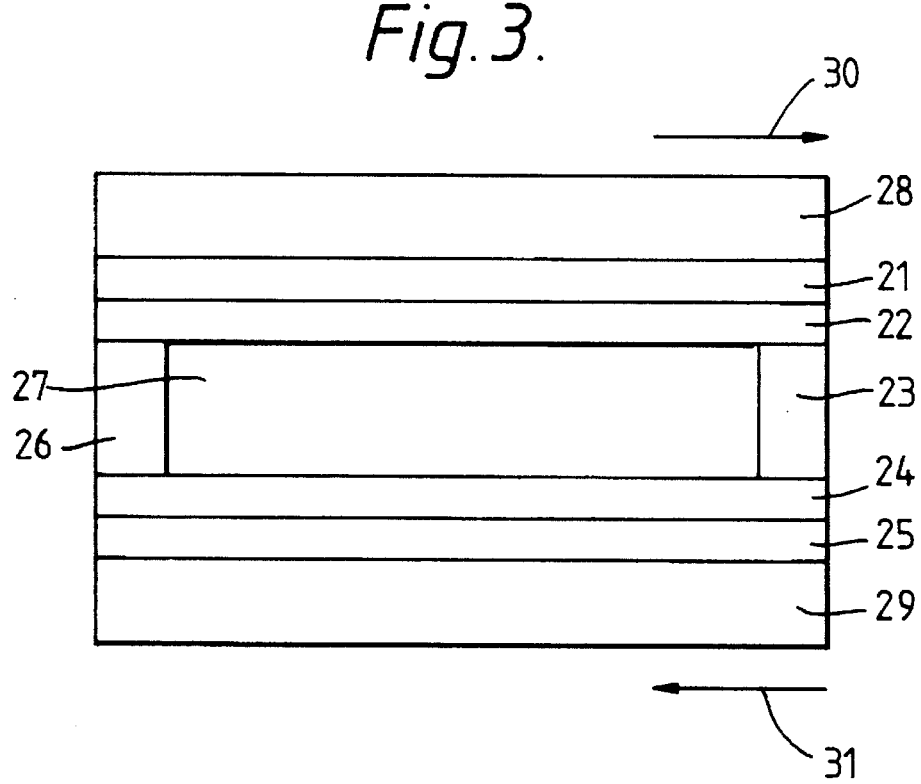
FIG. 3 illustrates a device for determining a pre-tilt angle β of the device illustrated in FIG. 2.

The surface pre-tilt angle β is determined by using another liquid crystal cell (refer to FIG. 3 for cross sectional view). In the device shown in FIG. 3, spacers 23 and 26 are provided. Each spacer is of 25 μm in size. The tilt angle cell of FIG. 3 comprises substrates similar to the substrate of FIG. 2 except that the protective films of FIG. 2 are not provided. In the device shown in FIG. 3, 28 and 29 are the glass substrates, 21 and 25 are the indium tin oxide films, 22 and 24 are the orientation layers of LQ1800. The orientation layers 22, 24 are rubbed in opposite directions 30 and 31. The two substrates 28 and 29 are assembled together with spacers 23 and 26. This tilt angle cell is injected with a nematic liquid crystal fluid E7 manufactured by Merck Company. The pre-tilt angle β of liquid crystal molecules in the nematic phase is measure by an optical null method (Mosley et al. Displays 8, 17–21 (1987).). The values of β obtained for LQ1800 are between 13° and 15°.

Figure 4:
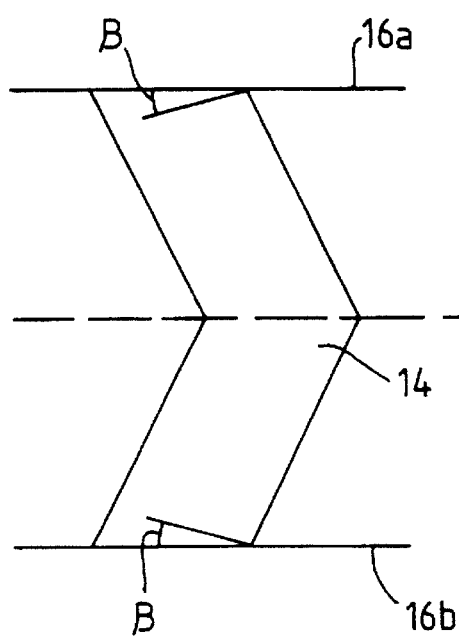
FIG. 4 illustrates change of C1 chevrons to and C2 chevrons and their orientations in the device embodying the invention.
Figure 4:
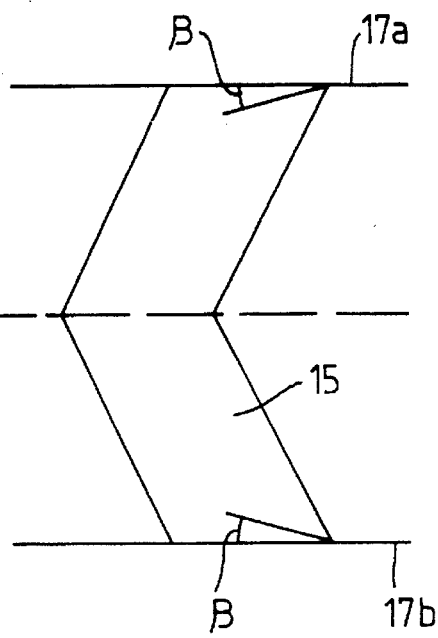
Figure 4:
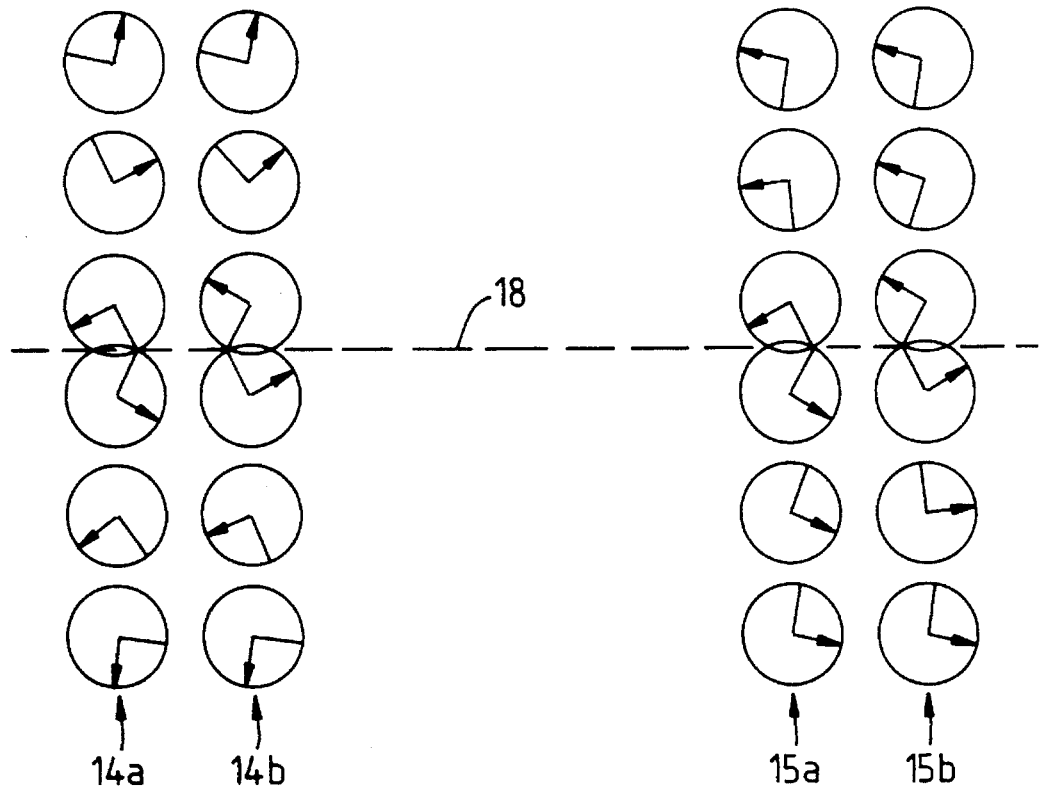

The device shown in FIG. 2 is injected with a ferro-electric fluid ZL1-4655-000 (Manufactured by Merck). The LC alignment as cooled from the isotropic phase to the smectic C* phase consists of only twisted C1 chevron states, 14, (FIG. 4) given by director profiles 14a and 14b where 18 is the chevron interface. This director profiles shown in FIG. 4 provides very low contrast devices in order to achieve the alignment structure of the present invention, a low frequency (10 Hz), low voltage (±30 V) electrical signal is applied across the liquid crystal in the direction normal to the substrates 1 and 9 for 30 seconds. This is followed by another low frequency (10 Hz) square wave of amplitude ±5 V for 1 minute. The alignment structure thus formed has a uniform C2 chevron states 15 as shown by director profiles 15a and 15b. The resultant uniform C2 chevron states are separated from the twisted C1 chevron states by zig-zags. The active region i.e. the pixels of displays should contain only uniform C2 chevron states. These states are referred to as uniform because they extinct when viewed between crossed polarizers.

Figure 1:
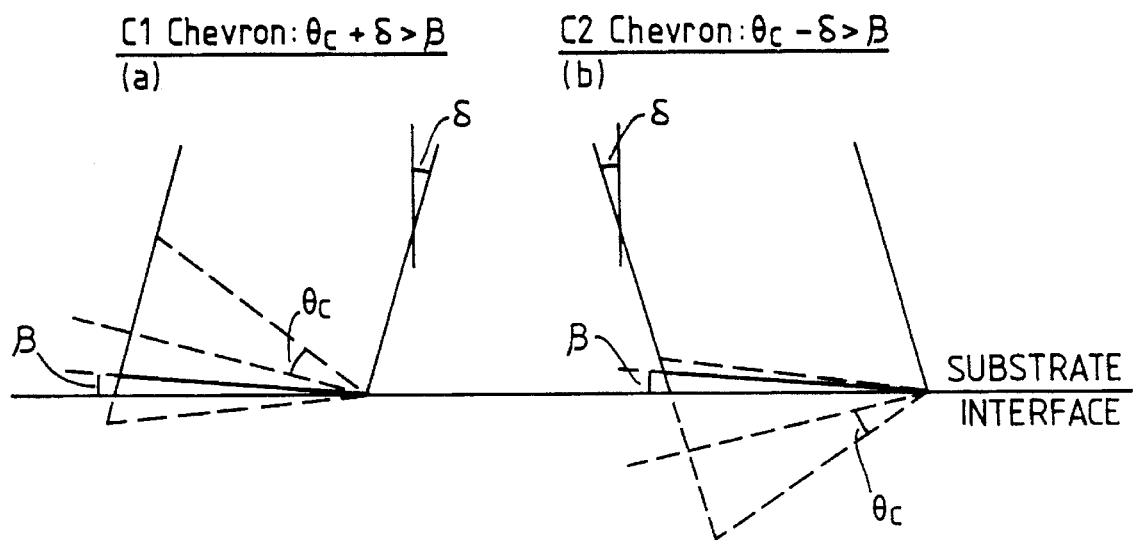
FIG. 1 illustrates geometrical conditions of chevron structures in a ferroelectric crystal device.
Figure 5:
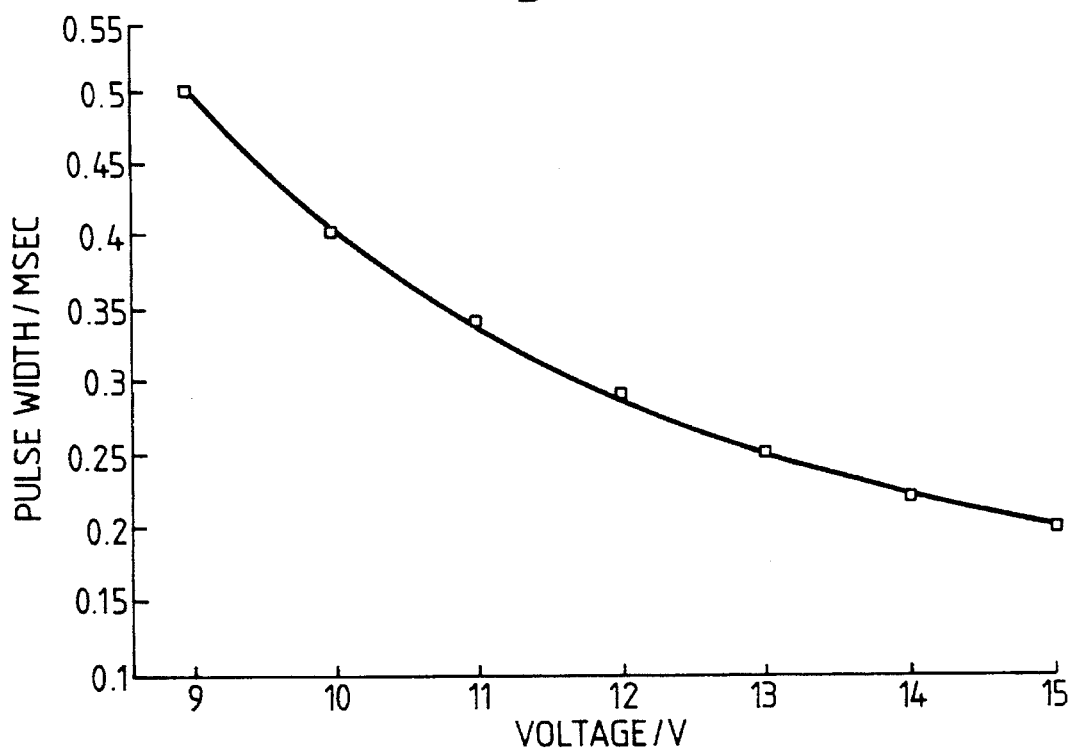
FIG. 5 illustrates a curve showing the minimum pulse width required for a given voltage for switching C2 chevron states between the bistable states.

FIG. 5 shows the switching behaviour of treated sample. The curve represents the minimum pulse width required for a given voltage to switch the uniform C2 chevron states clearly between the bistable states 15a and 15b. The threshold voltage of these states are approximately 10 V. The bistable switching angle is in the order of 30° and this can provide a transmissive contrast ratio of up to 30:1 between crossed polarizers and a corresponding transmission of $\geq 25\%$ with respect to parallel polarizers.

The Merck liquid crystal ZL1-4655-000 may be replaced with mixtures containing p% of ZL1-4655-000 and q% of ZL1-4655-100 (Merck fluid) where p+q=100. The orientation layer LQ1800 may be replaced by a layer produced by thermal evaporation at an angle of 5° to the plane of the substrates 1 and 9. Further ZL1-4655 mixtures may be replaced by Merck liquid crystal 91-678.

The ferro-electric liquid crystal structure according to the present invention provides large bistable switching angle combined with low electrical switching voltage requirement. The present invention is also advantageous in that it provides a relatively stable C2 chevron with very few visible defects.

We claim:

1. A method of producing a ferro-electric liquid crystal device, comprising the steps of:

providing a substrate having a surface alignment layer with a pre-tilt angle $\beta$ not less than 10°, and smectic liquid crystal layers having a C1 chevron structure only; and applying an alternating current waveform having a low frequency not greater than 500 Hz, and a low voltage not greater than 35 volts to the substrate to eliminate and replace the C1 chevron structure with a C2 chevron structure, said C2 chevron structure having a chevron angle $\delta$ lying in a range of $2° \leq \delta \leq 15°$, and a half cone angle $\theta_c$ being one half of a chiral smectic cone angle, said C2 chevron structure satisfying the condition that $\theta_c - \delta \geq \beta$, and wherein a bistable switching angle $\theta_s$ of the device is not less than 12°.

2. The method according to claim 1, wherein the providing step is performed by providing the surface alignment layer as a rubbed polymer layer.

3. The method according to claim 1, wherein the providing step is performed by constituting the surface alignment layer of silicon monoxide.

4. The method according to claim 1, wherein the providing step is performed by constituting the surface alignment layer of magnesium fluoride.

* * * * *